United States Patent [19]

Sakurai et al.

[11] 4,230,831

[45] Oct. 28, 1980

[54] POLYETHYLENE BLEND COMPOSITION

[75] Inventors: Hisaya Sakurai; Yoshihiko Katayama; Tadashi Ikegami; Kisoo Moriguchi; Shigeru Mizutani, all of Kurashiki, Japan

[73] Assignee: Asahi Kasei Kogyo Kabushiki Kaisha, Osaka, Japan

[21] Appl. No.: 78,737

[22] Filed: Sep. 25, 1979

[30] Foreign Application Priority Data

May 18, 1979 [JP] Japan .................................. 54-60387

[51] Int. Cl.$^2$ ............................................. C08L 23/06
[52] U.S. Cl. .................................................... 525/240
[58] Field of Search ......................................... 525/240

[56] References Cited

U.S. PATENT DOCUMENTS

| | | | |
|---|---|---|---|
| 2,983,704 | 5/1961 | Roedel | 525/240 |
| 3,183,283 | 5/1965 | Reding | 525/240 |
| 3,231,636 | 1/1966 | Snyder et al. | 525/240 |
| 3,381,060 | 4/1968 | Peacock et al. | 525/240 |
| 3,998,914 | 12/1976 | Lillis et al. | 525/240 |

*Primary Examiner*—Carman J. Seccuro
*Attorney, Agent, or Firm*—Sprung, Felfe, Horn, Lynch & Kramer

[57] ABSTRACT

An intimately melted and homogenized polyethylene composition having excellent physical properties and moldability and comprising a high-medium density polyethylene having a high molecular weight (A), a high-medium density polyethylene having a low molecular weight (B) and a low density polyethylene (C) characterized in that:

(i) the average molecular weight of (A) is 100,000–1,000,000, the average molecular weight of (B) is 1,000–100,000, the molecular weight ratio of (A) to (B) is 5–200, and (C) has an intrinsic viscosity [$\eta$] of 0.70 dl/g or more in decalin at 135° C. and an expansion factor of 3.3 or more, and (ii) the mixing ratio (A)/(B) is 30/70 to 80/20 and the mixing ratio of (C) in the composition is within the range from 1% by weight to less than 15% by weight.

20 Claims, No Drawings

POLYETHYLENE BLEND COMPOSITION

This invention relates to a polyethylene resin composition having excellent physical properties and moldability.

The characteristic properties of polyethylene required vary depending on the method of molding and the use, and the characteristic properties of the polymer are designed so as to fit for them. That is, a polymer having a relatively low molecular weight and a narrow molecular weight distribution is suitable for articles to be molded by injection molding process, while a polymer having a relatively high molecular weight and a broad molecular weight distribution is used for articles to be molded by extrusion, namely blow molding or inflation molding process.

As a process for producing a polyethylene having a broad molecular weight distribution and used for extrusion molding, there is proposed a process which comprises melting and mixing together a high molecular weight polyethylene and a low molecular weight polyethylene produced elsewhere (Japanese Patent Publication No. 3,215/1970, Japanese Patent Publication No. 22,007/1970). The polymer produced by this process has very excellent physical properties. That is, the polymer is superior to polymers produced by conventional processes in the balance of stiffness and environmental stress cracking resistance (ESCR), so that an article molded from the polymer exhibits sufficient strength and chemical resistance with a low thickness. For example, a bottle molded by the use of this resin is lightweight and can sufficiently compete with conventional products, so that its industrial value is quite high from the viewpoint of economizing resources and energies. Further, its high stiffness and good ESCR enable to use it under more severe conditions than ever and to give a product having a higher functionality than ever.

A polymer produced by mixing a high molecular weight polyethylene with a low molecular weight polyethylene has excellent performances mentioned above. On the contrary, however, it also has the following faults. That is, it shows a lower die swell than conventional polyethylene, it shows a low melt tension, and it is inferior in moldability. When a molten polymer is extruded from the die of molding machine, a swelling occurs due to Barus effect. This is called die swell. In the case of blow molding, a bottle is formed from cylindrical molten polymer having a constant length (parison). Polyethylene molding makers use many kinds of polyethylene grades for the sake of manufacturing articles meeting the various requirements of market. Since the polyethylene produced by mixing high molecular weight and low molecular weight polyethylenes is lower than these polymers in die swell, a bottle molded from it has a low wall thickness and product having constant quality is difficult to obtain. Exchange of die is necessary to control of the wall thickness, which decreases productivity and necessitates spare dies. As above, a great difference of die swell brings about a great disadvantage industrially.

In addition, such a polyethylene produced by mixing a high molecular weight polyethylene with a low molecular weight one has a fault that it shows a low melt tension and easily undergoes drawdown at the time of molding.

As the result of extensive studies, the presnt inventors succeeded in solving these difficult problems and obtained a composition having good physical properties. Thus, this invention relates to an intimately melted and homogenized polyethylene composition comprising a high-medium density polyethyelen having a high molecular weight (A), a high-medium density polyethylene having a low molecular weight (B) and a low density polyethylene (C) characterized in that:

(i) the average molecular weight of (A) is 100,000–1,000,000, the average molecular weight of (B) is 1,000–100,000, the molecular weight ratio of (A) to (B) is 5–200, and (C) has an intrinsic viscosity [$\eta$] of 0.70 dl/g or more in decalin at 135° C. and an expansion factor of 3.3 or more, and (ii) the mixing ratio (A)/(B) is 30/70 to 80/20 and the mixing ratio of (C) in the composition is within the range from 1% by weight to less than 15% by weight.

According to this invention, there is provided a polyethylene composition having an extensive industrial applicability, having a controlled die swell, a high melt tension and an excellent moldability, exhibiting a high stiffness and a high ESCR, quite excellent in physical properties and suitable for blow molding.

That is, it is the object of this invention to eliminate the faults of the disclosed polyethylene compositions and to provide a polyethylene composition having excellent physical properties and moldability. It is another object of this invention to make clear the formulation of such a composition, the necessary conditions which the constituents of such a composition must satisfy and the process for producing such a composition. Other objects of this invention will become apparent from the description given below.

Some compositions comprising high-medium density polyethylene and low density polyethylene are already disclosed. However, in the conception of these disclosed compositions, the composition of this invention is of course not disclosed and even a suggestion is not made there. For example, there is disclosed in Japanese Patent Publication No. 24,532/1968 a composition comprising a low density polyethylene (a), 0.3–8% by weight of a polyethylene having a density of 0.930 or more and a MI of 0.1 or less (b) and 1–33% by weight of a polyethylene having a density of 0.930 or more and a MI of 0.1 or more. However, this composition contains low density polyethylene in an amount of 50% or more and is entirely different from the composition of this invention in performances. As will become apparent from the detailed explanation, examples and comparative examples mentioned later, if the content of low density polyethylene exceeds 15% the physical properties are markedly deteriorated and the effect of this invention cannot be obtained. In Japanese Patent Publication No. 22,904/1969 and Japanese Patent Publication No. 6,022/1975 there is also disclosed a composition comprising low density polyethylene and high density polyethylene. However, this composition is different from the composition of this invention in that only one kind of high density polyethylene is used and the mixing ratio is different.

The high-medium density polyethylene having a high molecular weight (A) and the high-medium density polyethylene having a low molecular weight (B) which are both the constituents of this invention are homopolymers of ethylene or copolymers of ethylene and other olefins or dienes, these polymers having a density of 0.93–0.98. As said other olefins and dienes used in the copolymerization, $\alpha$-olefins such as propylene, butene, pentene, 4-methylpentene-1, hexene, octene, decene and the like, diolefins such as butadiene, isoprene and the like, and cycloolefins such as cyclopentene, cyclohexene, cyclopentadiene, norbornene and the like can be referred to.

The high molecular weight component (A) has an average molecular weight of 100,000–1,000,000 and preferably 300,000–800,000. The low molecular weight component (B) has an average molecular weight of 1,000–100,000 and preferably 5,000–50,000. The molecular weight ratio between (A) and (B) is 5–200 and preferably 10–100. If the molecular weight ratio is smaller than 5, the excellent physical properties of this invention are difficult ot obtain and the molecular weight distribution cannot be sufficiently broad so that the moldability is reduced. On the other hand, if the molecular weight ratio exceeds 200, there is no advantage in improving physical properties and moldability and there is a disadvantage from the viewpoint of manufacture of the polymer.

The high-medium density polyethylenes (A) and (B) can be produced by the usual suspension polymerization, gas phase polymerization or solution polymerization. The catalyst used in the polymerization may be any catalyst, so far as it can produce the high-medium density polyethylenes (A) and (B). Industrially, however, a high activity catalyst enabling to omit the catalyst removal step is preferable, and the catalysts and the polymerization processes disclosed in the inventions of the present inventors, i.e. Japanese Patent Publication No. 36,788/1977, No. 36,790/1977, No. 36,791/1977, No. 36,795/1977, No. 36,796/1977, No. 36,917/1977, Japanese Patent Kokai (Laid-Open) No. 127,490/1977, No. 70,991/1978 etc., are suitable for the purpose. As the process for the production, multi-step continuous processes of two or more steps may also be employed for the production of high-medium density polyethylenes (A) and (B).

The low density polyethylene (C), one of the constituents of this invention, is the so-called high pressure polyethylene having a density of 0.90–0.93. This polymer has an intrinsic viscosity $[\eta]$ of 0.07 dl/g or more and preferably 0.85 dl/g or more in decalin at 135° C. and an expansion factor of 3.3 or more and preferably 3.4 or more. If $[\eta]$ is smaller than 0.70, the effect of enhancing die swell and the effect of enhancing melt tension and thereby improving the moldability, both the characteristic features of this invention, cannot be obtained.

If the expansion factor is a low value less than 3.3, the effect of enhancing die swell and the effect of enhancing melt tension, both the characteristic features of this invention, cannot be obtained. The upper limit of the expansion factor is 4. Usually there is no low density polyethylene of which the expansion factor exceeds 4.

Herein, the term "expansion factor" means the ratio of $[\eta]$ determined in decalin at 135° C. (referred to as $[\eta]_{decalin}$) to $[\eta]$ determined in dioctyl adipate at 145° C. (referred to as $[\eta]_{DOA}$) and expressed by the following equation;

$$\text{Expansion factor} = [\eta]_{decalin}/[\eta]_{DOA}$$

The kind of the low density polyethylene (C) may include homopolymer of ethylene, its copolymers with other α-olefins such as propylene, butene and the like and its copolymers with vinyl monomers such as vinyl acetate, acrylic esters, vinyl chloride and the like.

The low density polyethylene is produced by the so-called high pressure process. Though the process includes tubular process and autoclave process, the low density polyethylene used in this invention is a special one which is said to be produced by autoclave process and satisfies the above-mentioned various characteristic properties. Of course, it may be produced by any process, so far as it displays the above-mentioned characteristic features and exhibits the effect of this invention.

Next, the mixing ratio between Components (A), (B) and (C) will be explained. The ratio (A)/(B) is in the range of 30/70 to 80/20 and preferably 40/60 to 70/30.

If proportion of (A) exceeds 80% or the proportion of (B) exceeds 70%, good physical properties and moldability cannot be obtained. The mixing ratio of component (C) to the composition is within the range from 1% by weight to less than 15% by weight, and preferably 3–10% by weight. By mixing it in this range, die swell and melt tension can be improved without injuring the physical properties of high-medium density polyethylene. If the amount of component (C) mixed is small, no effect is obtained. If the amount of component (C) mixed exceeds 15%, a deterioration in moldability such as flow property, melt extensibility, the surface state of molded product, etc. occurs and physical properties such as stiffness, ESCR, etc. deteriorate.

In mixing the three components (A), (B) and (C) together, (A), (B) and (C) may be mixed and kneaded simultaneously, or it is also allowable to previously mix any two of the three components and then mix and knead the third component therewith. Any of these two mixing methods may be employed.

The mixing of high-medium density polyethylenes (A) and (B) and low density polyethylene (C) is carried out under usual conditions in a molten state by using usual extruder or kneader. As said extruder, any of single screw type and double screw type may be employed. As that of double screw type, CIM manufactured by, for example, Nihon Seikosho, as well as FCM, DSM and the like manufactured by Farrel Co. may be used. As said kneader, Banbury mixer may be used, for example.

It is a matter of course that usual stabilizer, lubricant, antistatic agent, pigment and inorganic or organic filler may be incorporated into the composition of this invention. As examples of these materials, Irganox 1076 and 1010 manufactured by Ciba Geigy Co., BHT, DLTDP, calcium stearate, zinc stearate, lithium stearate, titanium white and the like can be referred to.

The effect of the low density polyethylene (C) for improving moldability, such as dei swell or melt tension, is markedly displayed only in the case of high-medium density polyethylenes obtainable by combining a high molecular weight polyethylene (A) with a low molecular weight polyethylene (B), such as that of this invention. In the case of polyethylenes obtainable by the usual one-step polymerization, the effect is hardly exhibited or the effect is very small even if it is exhibited.

Because of their excellent moldability, the articles molded by the use of the composition of this invention are quite excellent in uniformity of thickness, weld line strength, etc. and can be put to very extensive and severe uses by combining these excellent properties with the good physical properties of the composition itself. This composition is useful particularly for blow molding, extrusion molding and inflation molding. Examples of such molded articles include industrial materials; sheets for molding such as vacuum molding; containers such as drum for industrial chemicals, gasoline tank, bottle for liquid detergent and the like; shopping bag; and films for packaging industrial materials and foodstuffs.

Hereunder, this invention will be explained by way of examples, but the invention is by no means limited by these examples. The meanings of the terms used in the examples are as follows:

(i) Molecular weight ($M_w$): $M_w$ was determined from intrinsic viscosity $[\eta]$ measured in decalin at 135° C. and according to the following equation:

$$[\eta] = 6.8 \times 10^{-4} M_w 0.67$$

which is mentioned in Journal of Polymer Science, 36, 91 (1957).

(ii) Density: It was measured according to ASTM D-1505.

(iii) Izod impact strength: It was measured according to ASTM D-256.

(iv) MI: It expresses melt index. It was measured according to ASTM D-1238 at a temperature of 190° C. under a load of 2.16 kg.

(v) MIR: It means the quotient obtainable by dividing the value of MI measured under the conditions of MI measurement under a high load of 21.6 kg with the value of MI of the above-mentioned paragraph (iv). It is a measure of molecular weight distribution. Its higher value means a broader molecular weight distribution.

(vi) ESCR: It indicates environmental stress cracking resistance. It was measured by introducing a nonionic surfactant into a 500 ml bottle (weight 42 g, wall thickness 0.8 mm) molded by means of a 50$\phi$ blow molding machine at a cylinder temperature of 160° C. and a die temperature of 40° so as to fill up 10% of the inner volume, placing the bottle in an oven kept at 60° C. and applying a constant inner pressure. ESCR is expressed by the length of time required for breaking 50% of the tested bottles.

(vii) Die swell: It is expressed by the weight of parison, per 20 cm, extruded at a temperature of 170° C. by the use of a blow molding die having an outer diameter of 16 mm and an inner diameter of 10 mm.

(viii) Expansion factor: The ratio between $[\eta]$ measured in decalin at 135° C. (referred to as $[\eta]_{decalin}$) and $[\eta]$ measured in dioctyl adipate at 145° C. (referred to as $[\eta]_{DOA}$) is determined, which is taken as expansion factor.

Expansion factor = $[\eta]_{decalin}/[\eta]_{DOA}$ (ix) Melt tension: By means of a flow tester, a sample is extruded at a temperature of 190° C. at a plunger speed of 2.0 cm/min. The strand is stretched at a speed of 10 m/min. The tension at this time is taken as melt tension.

(x) Melt extensibility: It was judged from the state of extension of the strand in the above-mentioned measurement of melt tension. If the strand smoothly extends without breakage, the state of extension is good. If the strand breaks, or if the strand does not extend smoothly and the hunting of melt tension is great, the state of extension is not good.

EXAMPLES 1-4 AND COMPARATIVE EXAMPLES 1-6

(1) Synthesis of Catalyst 2 liters of 1 mole/liter solution of trichlorosilane ($HSiCl_3$) in hexane was introduced into an autoclave having a capacity of 8 liters and kept at 50° C. Thereto, 2 liters of 1 mole/liter solution of organoaluminum-magnesium complex having a composition of $AlMg_{6.0}(C_2H_5)_{2.0}(n-C_4H_9)_{9.5}(OC_4H_9)_{3.5}$ in hexane was dropped with stirring over a time period of 2 hours, and further reacted at this temperature for 2 hours. The resulting solid component was twice washed with 2 liters of hexane by sedimentation method. 2 liters of titanium tetrachloride was charged into the slurry containing the solid component and reacted at 130° C. for 2 hours, then, from which solid catalyst was isolated and washed with hexane until any free halogen became undetectable. The solid catalyst contained 2.1% by weight of titanium.

(2) Production of High-Medium Density Polyethylene (a) Production of high-medium density polyethylene having a high molecular weight (A)

Using a stainless steel made polymerization apparatus having a reaction volume of 200 liters, polyethylene was produced by continuous plymerization. The polymerization was controlled at a polymerization temperature of 86° C. and polymerization pressure of 12 kg/cm² G. As catalyst, triethylaluminum was introduced at a concentration of 0.5 mmole/liter, and a solid catalyst (0.5 g/hr) was introduced together with 30 liters/hour of hexane. Hydrogen, having a concentration of about 13% by volume, was used as a molecular weight regulator. Thus, a high molecular weight polyethylene having a molecular weight of 480,000 (A) was obtained at a rate of 8 kg/hour. The catalytic effect was 780,000 g polymer/g-Ti.

(b) Production of high-medium density polyethylene having a low molecular weight (B)

A polymer having a molecular weight of 24,000 was produced by carrying out polymerization under the same conditions as in (a), except that solid catalyst was introduced at a rate of about 3.5 g/hour and the concentration of hydrogen was about 73% by volume. The catalyst effect was 110,000 g polymer/g-Ti.

(3) Production of Polyethylene Composition

The polyethylenes (A) and (B) produced in (2) were mixed together at a ratio of 55:45, to which was added 6% by weight of the low density polyethylene (C) shown in Table 1. The mixture was kneaded together with 1,000 ppm of Irganox 1076 and 1,000 ppm of calcium stearate and extruded at 190° C. by means of an extruder of 40 mm$\phi$ to give pellets.

Beside above, the two polyethylenes (A) and (B) produced in (2) were mixed together at a ratio of 55:45. To the composition thus obtained comprising only the two components (A) and (B) and not containing the low density polyethylene (C) were added the same additives as above, and the mixture was formed into pellets under the same conditions as above (Comparative Example 1).

Characteristic properties of these compositions are shown in Table 1.

In Table 1, there are shown the characteristic properties of two-component composition (A)+(B) (Comparative Example 1), low density polyethylene (C), and various compositions (A)+(B)+(C) obtainable by adding various (C) to composition (A)+(B) (Examples 1-4 and Comparative Examples 2-6).

It is obvious from Table 1 that compositions (A)+(B) are low in melt tension and low in die swell, though they are excellent in Izod impact strength and ESCR.

On the other hand, the compositions (A)+(B)+(C) shown in Examples 1-4 of this invention are much improved in melt tension and die swell without injuring the Izod impact strength and ESCR of compositions (A)+(B).

In contrast to it, in the compositions (A)+(B)+(C) of Comparative Examples 2-6, melt tension is hardly improved and die swell is improved only to a small extent, though the Izod impact strength and ESCR of compositions (A)+(B) are not greatly debased. That is, in these comparative examples, a composition (A)+(B)+(C) shows no practical merit as compared with a composition (A)+(B). Accordingly, it is evident from these examples and comparative examples that the characteristic properties of component (C) exercise an important influence upon the characteristic properties of 3-component composition (A)+(B)+(C).

The effect of this invention shown in Table 1 will become more easily understandable from the explanation given below. Thus, the percent increases of melt tension and die swell in Examples 1-4 are 122-145% and 118-120%, respectively, while those in the comparative examples are 101-112% and 113-115%, respectively. That is, the moldability-improving effect clearly varies with the kind of component (C).

The above-mentioned percent increases have been calculated according to the following equation:

$$\frac{\text{Characteristics of } (A) + (B) + (C)}{\text{Characteristics of } (A) + (B)} \times 100 = \text{Percent increase (\%)}$$

TABLE 1

| | (A) + (B) | | | | | | |
|---|---|---|---|---|---|---|---|
| | MI (g/10 min.) | Density (g/cm³) | MIR | Melt tension (g) | Die swell (g) | Izod impact strength (kg-cm/cm) | ESCR (hrs) |
| Example 1 | | | | | | | |
| Example 2 | | | | | | | |
| Example 3 | The same as in Comparative Example 1 | | | | | | |
| Example 4 | | | | | | | |
| Comparative Example 1 | 0.22 | 0.961 | 124 | 10.0 | 36.0 | 18.5 | 25.5 |
| Example 2 | | | | | | | |
| Example 3 | | | | | | | |
| Example 4 | The same as in Comparative Example 1 | | | | | | |
| Example 5 | | | | | | | |
| Example 6 | | | | | | | |

| Grade No. | (C) | | | | | | |
|---|---|---|---|---|---|---|---|
| | MI (g/10 min.) | Density (g/cm³) | MIR | Melt tension (g) | [η] decalin | Expansion factor | MI (g/10 min.) |
| Asahi Dow AD-1000 | 0.47 | 0.918 | 64 | 25.0 | 1.16 | 3.5 | 0.23 |
| Asahi Dow M-1820 | 2.1 | 0.918 | 59 | 21.0 | 0.93 | 3.6 | 0.24 |
| Sumikathen G101 | 2.2 | 0.921 | 38 | 17.5 | 1.16 | 3.6 | 0.23 |
| Asahi Dow M-6545 | 45 | 0.915 | Round No.* 30 | 0.02 | 0.77 | 3.7 | 0.26 |
| Asahi Dow F-2004 | 0.40 | 0.920 | 85 | 18.1 | 1.07 | 3.2 | 0.22 |
| Asahi Dow F-2135 | 3.0 | 0.921 | 55 | 3.3 | 0.87 | 3.1 | 0.24 |
| Asahi Dow F-1920 | 1.8 | 0.919 | 62 | 7.3 | 0.93 | 3.2 | 0.23 |
| Sumikathen F-101-1 | 0.29 | 0.924 | 68 | 27.0 | 0.17 | 3.2 | 0.23 |
| Yukalon MV-30 | 45 | 0.918 | Round No.* 30 | 0.01 | 0.60 | 2.6 | 0.25 |

| (A) + (B) + (C) | | | | | | |
|---|---|---|---|---|---|---|
| Density (g/cm³) | MIR | Melt tension (g) | Die swell (g) | Izod impact strength (kg-cm/cm) | ESCR (hrs) | Amount of component C (%) |
| 0.959 | 93 | 14.5 | 43.3 | 18.0 | 22.9 | 6 |
| 0.959 | 95 | 14.0 | 42.8 | 17.9 | 22.0 | 6 |
| 0.959 | 108 | 14.3 | 43.0 | 18.1 | 22.5 | 6 |
| 0.959 | 114 | 12.2 | 42.4 | 17.1 | 21.7 | 6 |
| 0.959 | 92 | 11.2 | 41.4 | 17.5 | 21.5 | 6 |
| 0.959 | 107 | 11.1 | 41.3 | 16.4 | 20.1 | 6 |
| 0.959 | 95 | 11.2 | 41.5 | 17.1 | 17.5 | 6 |
| 0.959 | 115 | 11.0 | 41.1 | 17.1 | 18.1 | 6 |
| 0.959 | 88 | 10.1 | 40.9 | 15.1 | 15.1 | 6 |

*MIR Round No.:
It is expressed by round number because of the lower accuracy of measurement than in other grades.

EXAMPLES 5, 6 AND COMPARATIVE EXAMPLES 7, 8

Compositions comprising (A), (B) and (C) were prepared by repeating the procedure of Example 1, except that the mixing ratio of low density polyethylene (C) (Asahi Dow AD-1000) was varied.

The results are shown in Table 2. It is obvious from Table 2 that, when the amount of low density polyethylene (C) is 20% or 40%, moldability is not good (for example, MIR is low, melt extensibility is low, or the surface state of molded article is not good) and Izod impact strength and ESCR decrease, so that the merit of 3-component composition (A)+(B)+(C) is small.

TABLE 2

| Example | Amount of component C (%) | MI (g/ 10 min.) | Density (g/cm³) | MIR | Melt tension (g) | Die swell (g) | Izod impact strength (kg-cm/cm) | ESCR (hrs) | Melt extensibility |
|---|---|---|---|---|---|---|---|---|---|
| Example 5 | 2 | 0.22 | 0.961 | 115 | 11.9 | 41.8 | 18.8 | 26.5 | Good |
| Example 6 | 12 | 0.24 | 0.956 | 85 | 17.2 | 44.5 | 17.5 | 21.4 | Good |
| Comparative Example 7 | 20 | 0.25 | 0.950 | 72 | 22.8 | 46.1 | 13.9 | 14.3 | Rather no good |
| Comparative Example 8 | 40 | 0.30 | 0.944 | 67 | Un-* measurable | 48.2 | 12.1 | 10.6 | No good |

*Unmeasurable because of the poor melt extensibility.

EXAMPLE 7

A high molecular weight polyethylene (A) and a low molecular weight polyethylene (B) were synthesized by using the same catalyst as in Example 1 and by repeating the procedure of Example 1.

In this case, the composition of gas phase was controlled so that molecular weight of (A) became 580,000. The concentration of hydrogen was about 10%, and the catalytic effect was 850,000 g/g-Ti. Molecular weight of (B) was controlled so as to become 15,000. The concentration of hydrogen was about 76%, and the catalytic effect was 100,000 g/g-Ti.

(A) and (B) thus produced were blended together at a ratio of 45:55. To 100 of this composition was added a low density polyethylene (C) (Asahi Dow AD-1000) in an amount of 5%, and the resulting mixture was kneaded and extruded in the same manner as in Example 1 to produce a 3-component composition (A)+(B)+(C).

The characteristic properties of this composition are shown in Table 3.

COMPARATIVE EXAMPLE 9

In Example 7, a 2-component composition (A)+(B) was similarly evaluated. The results are shown in Table 3.

TABLE 3

| Example | Amount of component C (%) | MI (g/ 10 min.) | Density (g/cm³) | MIR | Melt tension (g) | Die swell (g) | Izod impact strength (kg-cm/cm) | ESCR (hrs) | Note |
|---|---|---|---|---|---|---|---|---|---|
| Example 7 | 5 | 0.28 | 0.960 | 113 | 12.8 | 41.8 | 15.0 | 37.0 | (A) + (B) + (C) |
| Comparative Example 9 | — | 0.27 | 0.961 | 145 | 8.4 | 35.0 | 15.1 | 37.5 | (A) + B) |

As is apparent from Table 3, the composition of this invention has high melt tension and die swell, is excellent in processability and is excellent in properties such as impact strength, ESCR, etc.

EXAMPLE 8

The high molecular weight polyethylene (A) and the low molecular weight polyethylene (B), synthesized in Example 7, were blended together at a ratio of 60:40. To 100 of this composition was added a low density polyethylene (C) (Asahi Dow M-1820) in an amount of 8%. The resulting mixture was kneaded and extruded in the same manner as in Example 1 to produce a 3-component composition (A)+(B)+(C).

The characteristic properties of this composition are shown in Table 4.

COMPARATIVE EXAMPLE 10

In Example 8, a 2-component composition (A)+(B) was similarly evaluated. The results are shown in Table 4.

TABLE 4

| Example | Amount of component C (%) | MI (g/ 10 min.) | Density (g/cm³) | MIR | Melt tension (g) | Die swell (g) | Izod impact strength (kg-cm/cm) | ESCR (hrs) | Note |
|---|---|---|---|---|---|---|---|---|---|
| Example 8 | 8 | 0.12 | 0.960 | 110 | 21.5 | 45.0 | 33.7 | 64.0 | (A) + (B) + (C) |
| Comparative Example | — | 0.09 | 0.962 | 131 | 14.0 | 38.1 | 35.1 | 66.0 | (A) + (B) |

TABLE 4-continued

| Example | Amount of component C (%) | MI (g/ 10 min.) | Density (g/cm³) | MIR | Melt tension (g) | Die swell (g) | Izod impact strength (kg-cm/cm) | ESCR (hrs) | Note |
|---|---|---|---|---|---|---|---|---|---|
| 10 | | | | | | | | | |

As is obvious from Table 4, the composition of this invention has a high melt tension and a high die swell, is excellent in processability, and is excellent in properties such as impact strength, ESCR, etc.

COMPARATIVE EXAMPLE 11

(1) Synthesis of Catalyst 100 g of dehydrated commercially available anhydrous magnesium chloride and 15 g of titanium trichloride (AA grade manufactured by Stauffer Chemical Co.) were charged into a stainless steel made ball mill having an inner volume of 3 liters and containing 60 pieces of stainless steel ball of 25 mmφ in an atmosphere of nitrogen, and pulverized altogether for 5 hours by means of a vibrating ball mill to obtain a catalyst solid. This solid contained 3.1% by weight of Ti.

(2) Polymerization

Using one polymerizing machine of 200 liter capacity, employed in Example 1, polymerization was carried out at a temperature of 86° C. at a polymerization pressure of 12 kg/cm² with the above-mentioned solid catalyst (1.7 g/hr) and triisobutylaluminum (32 mmole/hr) as polymerization catalysts. The catalytic effect was 150,000 g polymer/g-Ti, and the MI was 0.24 g/10 min.

(3) Composition

The polymer produced in (2) was kneaded together with a low density polyethylene (Asahi Dow AD-1000) in the same manner as in Example 1 so that the content of the latter became 6%.

The characteristic properties of the one-step process high density polyethylene of Comparative Example 11 and the characteristic properties of the composition comprising this one-step high density polyethylene and the low density polyethylene are shown in Table 5.

more in decalin at 135° C. and an expansion factor of 3.3 or more; and (ii) the mixing ratio (A)/(B) being 30/70 to 80/20 and the mixing ratio of (C) in the composition being within the range from 1% by weight to less than 15% by weight.

2. A polyethylene composition according to claim 1, wherein the high molecular weight component (A) has an average molecular weight of 300,000–800,000, the low molecular weight component (B) has an average molecular weight of 5,000–50,000 and the molecular weight ratio between (A) and (B) is 10–100.

3. A polyethylene composition according to claim 1, wherein the low density polyethylene (C) has an intrinsic viscosity of 0.85 dl/g or more and an expansion factor of 3.3 or more.

4. A polyethylene composition according to claim 2, wherein the low density polyethylene (C) has an intrinsic viscosity of 0.85 dl/g or more and an expansion factor of 3.3 or more.

5. A polyethylene composition according to claim 1, wherein the ratio of high molecular weight component (A) to low molecular weight component (B) is 40/60 to 70/30.

6. A polyethylene composition according to claim 2, wherein the ratio of high molecular weight component (A) to low molecular weight component (B) is 40/60 to 70/30.

7. A polyethylene composition according to claim 3, wherein the ratio of high molecular weight component (A) to low molecular weight component (B) is 40/60 to 70/30.

8. A polyethylene composition according to claim 4, wherein the ratio of high molecular weight component (A) to low molecular weight component (B) is 40/60 to 70/30.

TABLE 5

| Comparative Example 11 | Amount of component C (%) | Composition | | | | | | |
|---|---|---|---|---|---|---|---|---|
| | | MI (g/ 10 min.) | Density (g/cm³) | MIR | Melt tension (g) | Die swell (g) | Izod impact strength (kg-cm/cm) | ESCR (hrs) |
| Polymer | 0 | 0.24 | 0.963 | 90 | 11.8 | 40.3 | 21.0 | 8.7 |
| Composition | 6 | 0.25 | 0.961 | 75 | 11.9 | 43.4 | 17.4 | 6.4 |

As is understandable from comparison with Example 1, the effect of low density polyethylene is quite small in the case of one-step process high density polyethylene.

What is claimed is:

1. An intimately melted and homogenized polyethylene composition comprising a high-medium density polyethylene having a high molecular weight (A), a high-medium density polyethylene having a low molecular weight (B) and a low density polyethylene (C):

(i) the average molecular weight of said (A) being 100,000–1,000,000, the average molecular weight of said (B) being 1,000–100,000, the molecular weight ratio of (A) to (B) being 5 to 200, and said (C) having an intrinsic viscosity [η] of 0.70 dl/g or 9. A polyethylene composition according to claim 1, wherein the mixing ratio of low density polyethylene (C) in the composition is from 3% by weight to 10% by weight.

10. A polyethylene composition according to claim 2, wherein the mixing ratio of low density polyethylene (C) in the composition is from 3% by weight to 10% by weight.

11. A polyethylene composition according to claim 3, wherein the mixing ratio of low density polyethylene (C) in the composition is from 3% by weight to 10% by weight.

12. A polyethylene composition according to claim 4, wherein the mixing ratio of low density polyethylene (C) in the composition is from 3% by weight to 10% by weight.

13. A polyethylene composition according to claim 5, wherein the mixing ratio of low density polyethylene (C) in the composition is from 3% by weight to 10% by weight.

14. A polyethylene composition according to claim 6, wherein the mixing ratio of low density polyethylene (C) in the composition is from 3% by weight to 10% by weight.

15. A polyethylene composition according to claim 7, wherein the mixing ratio of low density polyethylene (C) in the composition is from 3% by weight to 10% by weight.

16. A polyethylene composition according to claim 8, wherein the mixing ratio of low density polyethylene (C) in the composition is from 3% by weight to 10% by weight.

17. A product which has been molded by the use of composition of claim 1.

18. A product which has been blow molded from the composition of claim 1.

19. A product which has been extruded from the composition of claim 1.

20. A film which has been inflation molded from the composition of claim 1.

* * * * *